United States Patent Office 3,377,334
Patented Apr. 9, 1968

3,377,334
DISPROPORTIONATION OF ROSIN
Joseph James McBride and Charles Glenn Wheelus, Panama City, Fla., assignors to Arizona Chemical Company, a corporation of Delaware
No Drawing. Continuation-in-part of applications Ser. No. 496,674, Oct. 15, 1965, and Ser. No. 560,845, June 27, 1966. This application Sept. 16, 1966, Ser. No. 579,817
7 Claims. (Cl. 260—98)

ABSTRACT OF THE DISCLOSURE

Disproportionated rosin of improved color is obtained by heating, at disproportionating temperatures of about 180°–350° C. and for a time sufficient to reduce the abietic acid content to a desired low figure below 15%, rosin containing about 0.01% to 1% of a phenol sulfide of the formula

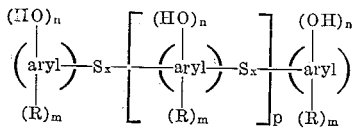

wherein aryl, R, and the subscripts $m$, $n$, $p$ and $x$ are as hereinafter defined.

---

This application is a continuation-in-part of applications Ser. Nos. 496,674, filed Oct. 15, 1965, and 560,845, filed June 27, 1966, both now abandoned.

This invention relates to the disproportionation and bleaching of rosin, including tall oil rosin, wood rosin, gum rosin, crude materials and mixtures containing any of the foregoing, and in general, abietic acid-containing materials. Rosin mixtures include any of the mixtures of abietic acid with tall oil or tall oil fractions containing various proportions of rosin and fatty acids.

Rosin is widely employed in the manufacture of paper size, ester gums and synthetic resins, protective coatings, adhesives, printing ink vehicles, greases and foundry supplies, emulsifiers for disinfectants, insecticides and other soap and chemical supplies, and in rubber polymerization and compounding. The main constituent of rosin is abietic acid and isomers thereof, including neoabietic, levopimaric, palustric, dihydroabietic, dehydroabietic, pimaric and isopimaric acids.

Since the conjugated double bonds of abietic acid render the rosin sensitive to oxidation, it has become important for commercial acceptance of the rosin that the abietic acid content be reduced as low as required for stability of the particular formulations and derivatives prepared from the rosin. This is commonly achieved by "disproportionation"—the displacement of hydrogen in the abietic acid of the rosin to convert the same into isomeric acids, particularly dehydroabietic acid, which acids lack nonbenzenoid double bond conjugation and are therefore more stable to oxidation than abietic acid.

It is known that rosin can be disproportionated by heating at elevated temperature in the presence of catalytic materials such as sulfur, sulfur dioxide, iodine and noble metals such as platinum and palladium. These treatments, however, exhibit certain deficiencies such as inability to bleach as well as to disproportionate and additional expense engendered by the substantial quantities of additive required and, when bleaching with noble metals, the loss of rosin during filtration.

An object of the present invention is to provide a method of disproportionating rosin while also achieving color improvement, i.e., lighter color.

A further object is to provide a rosin disproportionation process which does not require the removal of the disproportionation catalyst from the treated rosin and which is more economical since the disproportionation catalyst may be employed in substantially smaller amounts than has been heretofore attainable.

Another object is to provide rosin having a substantially reduced content of conjugated unsaturated acids of the nonbenzenoid type, particularly abietic acid.

These and other objects, features, and advantages of the invention are further detailed in the description which follows.

Accordingly, it has now been discovered that these objects are achieved by a disproportionation process which comprises heating rosin in the presence of an effective amount of a treating compound.

The treating agents may be represented by the general formula:

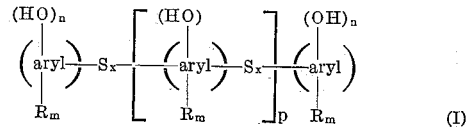
(I)

where $n$ is an integer from 1 to 3 inclusive, $p$ is an integer from 0 to 100 and preferably about 5 to 20, $x$ is from 1 to 3, and the sum of $m$ and $n$ on each aryl is between 1 and 5 inclusive, and R is a hydrocarbon group, e.g., alkyl, cycloalkyl and substituted alkyl, e.g., $C_1$–$C_8$, wherein the substituents are cycloalkyl, aryl, alkaryl, and the like. R desirably contains from 1 to 22 carbon atoms inclusive. Preferred alkyl groups are straight chain secondary and tertiary alkyl groups containing up to 8 carbon atoms inclusive. Preferred aryl groups are those containing 6 to 18 carbon atoms inclusive, typically phenyl, naphthyl and anthracyl. Typical cycloalkyl groups contain 3-8 carbon atoms in the ring, e.g., cyclopropyl, cyclopentyl and cyclohexyl.

In Formula I when aryl is phenyl it will be apparent that when $p$ is 0 the sum of $m$ and $n$ on each phenyl ring will not be more than 5 and when $p$ is 1 or higher the sum of $m$ and $n$ on each phenyl ring will not be more than 4. It will also be apparent, however, that the sum of $n$ and $m$ may range higher when aryl is naphthyl or anthracyl since when $p$ is 0 or at least 1 more than 5 or 4 sites, respectively, are available for OH and R substituents. The values for $m$, $n$, $x$ and $p$, except when 0, are positive, whole numbers.

Included are compounds and position isomers having R groups of mixed character, i.e., the R group or groups on one aryl ring may differ from the R group or groups on the other aryl ring; $m$ and $n$ may be the same or different for each aryl ring; and when more than one R group is present on an aryl ring, such groups may be identical or different.

The term "treating agent" or "treating compound," or like term, is intended herein to mean compounds defined by Formula I above.

From the repeating unit of Formula I above it will be seen that the invention includes not only the use of thiobis compounds (p equals 0) but also higher molecular weight materials, for example, where p is 100 or more, provided sufficient sites are available for polymerization, e.g., the sum of n and m where aryl is phenyl does not exceed 4. The upper limit of molecular weight is dependent only upon how the compound is made, e.g., whether the material is sufficeintly fluid in the reaction medium for polymerization to continue, and upon use conditions, e.g., whether the material can be effectively admixed or blended for good contact with the material to be bleached. Obviously, a polymer of such high molecular weight as to be unmanageably tacky or glassy is to be avoided in the practice of the invention. From the viewpoint of economy and ease of preparation and use according to the invention, preferred treating agents are those which are soluble in the material treated, e.g., compounds of Formula I wherein p is in the range of 5 to about 20.

As typical and non-limiting examples of the treating agents may be mentioned:

Thiobis naphthols, e.g.,
1,1'-thiobis(β-naphthol)
2,2'-thiobis(α-naphthol)
2,2'-thiobis phenols, e.g.,
2,2'-thiobis(4-methyl-6-tert.-butylphenol)
2,2'-thiobis(4,6-dimethylphenol)
2,2'-thiobis(4,6-di-tert.-butylphenol)
2,2'-thiobis(4-ethyl-6-tert.-butylphenol)
2,2'-thiobis(4-n-propyl-6-amylphenol)
2,2'-thiobis(4-methyl-6-n-octylphenol)
2,2'-thiobis(4-amyl-6-tert.-octylphenol)
2,2'-thiobis(4-methyl-6-n-decylphenol)
2,2'-thiobis(4-methyl-6-laurylphenol)
2,2'-thiobis[4-methyl-6-(1-methylcyclohexyl)phenol]
2,2'-thiobis[4-methyl-6-(1-methylbenzyl)phenol]
2,2'-thiobis(4-methylphenol)
2,2'-thiobis(6-tert.-butylphenol)
2,2'-thiobis(4,6-dilaurylphenol)
2,2'-thiobis(4,6-distearylphenol)
3,3'-thiobisphenols, e.g.,
3,3'-thiobis-[methyl-6-(1,1,3,3,-tetramethylbutyl)phenol]
3,3'-thiobis-(methyl-6-t-dodecylphenol)
3,3'-thiobis(pentadecyl-t-butylphenol)
4,4'-thiobis phenols, e.g.,
4,4'-thiobis(3-methyl-6-tert.-butylphenol)
4,4'-thiobis[3-methyl-6-(1-methylcyclohexyl)phenol]
4,4'-thiobis(2-methyl-6-tert.-butylphenol)
4,4'-thiobis(3,6-dimethylphenol)
4,4'-thiobis(3,6-di-tert.-butylphenol)
4,4'-thiobis(3-ethyl-6-tert.-butylphenol)
4,4'-thiobis(3-n-propyl-6-amylphenol)
4,4'-thiobis(3-methyl-6-n-octylphenol)
4,4'-thiobis(3-amyl-6-tert.-octylphenol)
4,4'-thiobis(3-methyl-6-n-decylphenol)
4,4'-thiobis(3-methyl-6-laurylphenol)
4,4'-thiobis(3,6-dilaurylphenol)
4,4'-thiobis(3,6-distearylphenol)
4,4'-thiobis[3-methyl-6-(1-methylcyclohexyl)phenol]
4,4'-thiobis[3-methyl-6-(1-methylbenzyl)phenol]
4,4'-thiobis(2-tert.-butylphenol)
4,4'-thiobis[2-methyl-6-(1-methylcyclohexyl)phenol]
4,4'-thiobis[2-methyl-6-(1-methylbenzyl)phenol]
4,4'-thiobis(2-methyl-6-tert.-butylphenol)
4,4'-thiobis(2-tert.-butylphenol)
4,4'-thiobis(2-methyl-6-laurylphenol)
4,4'-thiobis(2,6-distearylphenol)
4,4'-thiobis[2,6-di(α-methylbenzyl)phenol]
4,4'-thiobis[2,6-di(α,α-dimethylbenzyl)phenol]
4,4'-thiobis[3-(α-methylbenzyl)-6-(α,α-dimethylbenzyl)phenol]

Thiobis-polyhydroxy compounds, e.g., 4,4'-thiobis(resorcinol), 5,5'-thiobis(pyrogallol), the di- and trithiobis variants of any of the foregoing, and higher molecular weight materials corresponding to the repeating unit of any of the foregoing. These and other like compounds are disclosed, for example, in U.S. Patents 2,670,382, 2,670,383, 2,841,619, 3,060,121, 3,069,384, 3,157,517, 3,211,794 and Compt. rend. 198, 1791–3 (1934), said disclosures being incorporated herein by reference.

Particularly preferred are the polyhydroxy compounds such as 44'-thiobis(resorcinol) and 5,5'-thiobis(pyrogallol), the so-called "hindered" thiobisphenols, i.e., those wherein each aromatic ring is substituted by one hydroxy group, one bulky group, e.g., secondary or tertiary alkyl group, and one short straight chain ($C_1$–$C_8$) alkyl group, and higher molecular weight compounds wherein p is in the range of 5 to 20. Typical of the "hindered" thiobisphenols are 2,2'-thiobis(4-methyl-6-tertiary-butylphenol); 4,4'-thiobis(6-tertiary butyl meta cresol); and 4,4'-thiobis-(6-tertiary butyl ortho cresol). Of the thiobisphenols, the first shows best results and it has been observed that as the sulfur atom is shifted away from a position ortho to the hydroxyl and the methyl group is shifted toward the ortho from the para position, efficiency decreases. Typical of the higher molecular weight compounds is poly[thio-(resorcinol)] wherein p is 6 to 9.

The conditions for disproportionation and bleaching will vary depending on the starting rosin material and the degree of disproportionation desired. The disproportionation may be carried out at a temperature between 180° C. and 350° C. Tall oil rosin effectively disproportionated by heating the rosin in the presence of the treating compound at from about 250° C. to 350° C. for from about 1 to 8 hours, wherein the longer times correspond to lower treating temperatures and vice versa. Preferred ranges are from about 290° C. to 320° C. for from about 3 to 6 hours.

By "effective amount" of the treating compound is meant sufficient concentration of the additive to provide catalytic formation of the oxidatively insensitive isomers of abietic acid. The amounts of the additive may be further described as minor or catalytic amounts, ranging from about 0.01% to 1.0%, preferably 0.1% to 0.5%, by weight of the rosin. By operating with concentrations of catalyst at the higher end of the range and extending the time of treatment, disproportionation can be effected at lower temperatures, e.g., in the range of about 200° C. to 250° C. However, in all cases, the conditions of treatment will be governed by considerations of economy, i.e., conditions effective for reasonably fast rate of disproportionation while avoiding conditions which will cause degradation of the rosin, such as extreme temperatures.

The degree of disproportionation may be controlled as desired and as dictated by the degree of stability required in the end use. Generally, the abietic acid content should be reduced to less than about 15% by weight of the rosin and preferably to the more commercially acceptable level of less than about 5%, same basis. Reduction of abietic acid content can be followed during the reaction by sampling and analysis, employing any of the procedures known in the art such as the "Rubber Reserve" (ultraviolet) method or, preferably, by gas-liquid chromatography.

Sequence of admixture of the rosin or rosin mixture with the treating agent is not critical. Likewise, the rosin may be heated to the desired temperature before the treating compound is added or rosin and additive may be first admixed, followed by heating. The process may be conducted at atmospheric, subatmospheric or superatmospheric pressures with corresponding variation in temperature and time of reaction. Also, the process may be batch, semi-continuous or continuous and mixtures of thiobis compounds are useful.

To avoid oxidation, the treatment is generally conducted under a blanket of inert gas such as nitrogen, carbon dioxide, steam and the like.

The disproportionation and bleaching achieved by the method of the invention are surprising results since the effects are simultaneous and it would not be expected that the treating compounds, some of which are known antioxidants, would be disproportionation catalysts as well as bleaching agents. In this regard, the invention is distinguished from that of copending application Ser. No. 579,819 filed Sept. 16, 1966, which describes bleaching of rosin compounds with the treating compounds in that the conditions of treatment in the latter case are less stringent and involve little or no transformation of abietic acid as compared with the present invention wherein abietic acid is reduced to less than about 15% by weight of the rosin.

The following examples further illustrate the invention but are not limitative thereof except as indicated in the appended claims. All parts and percentages are by weight unless otherwise specified.

TABLE I

| | Example 1 | | Example 2 | |
|---|---|---|---|---|
| | Feed | Product | Feed | Product |
| TBP, percent | 0.1 | | 0.4 | |
| Abietic Acid, percent | 30.5 | 3.0 | 30.5 | 1.7 |
| Color | X | 4A | 2A | 3A |

EXAMPLES 3–4

Table II reports the effect of treating the same type tall oil rosin as in Examples 1–2 employing the same thiobisphenol and following substantially the same procedure except that heating was at 350° C. for a total of 2 hours. The reaction mixtures were sampled each half hour for color and abietic acid determinations, the latter by UV. Initial abietic acid content was about 27% and initial color was Y. The examples show very rapid disproportionation and bleaching at this more elevated temperature.

TABLE II

| | Example 3 (0.1K TBP) | | | Example 4 (0.5K TBP) | | |
|---|---|---|---|---|---|---|
| Time, Hrs. | Abietic Acid Percent | Dehydroabietic Acid Percent | Color | Abietic Acid Percent | Dehydroabietic Acid, Percent | Color |
| ½ | 2.6 | 31.8 | 3A | 1.2 | 34.7 | 2A |
| 1 | 1.0 | 33.8 | WG | 0.8 | 33.9 | X |
| 1½ | 0.7 | 36.6 | WG | 0.7 | 35.3 | X |
| 2 | 0.7 | 36.1 | WG | 0.8 | 36.2 | WW |

EXAMPLES 5–6

In essentially the same manner as in Examples 1–4, the same type rosin was heated at 300° C. with 0.2% of the thiobisphenols indicated in Table III for 6 hours with sampling after each 2 hours for acid and color analyses. Good disproportionation and bleaching resulted in each instance.

TABLE III

| | Time, hours, Feed | Abeitic Acid, Percent- 31.2 | Dehydroabietic Acid, Percent | Color, Y |
|---|---|---|---|---|
| Example 5—4,4-'thiobis(6-tert-butyl-meta cresol) | 2 | 9.4 | 22.4 | 6A |
| | 4 | 7.1 | 41.4 | 6A |
| | 6 | 3.3 | 32.5 | 6A |
| Example 6—4,4'-thiobis(6-tert-butyl-ortho cresol) | 2 | 9.0 | 24.0 | 6-A7A |
| | 4 | 6.1 | 30.7 | 6A-7A |
| | 6 | 3.0 | 33.1 | 5A |

EXAMPLES 1–2

The data of Table I is based on reactions conducted substantially as follows:

To a suitable reaction vessel was charged tall oil rosin conforming to the Naval Stores Act (Feb. 8, 1952) and Federal Specification LLL–R–6266, Class C (May 27, 1957), except for less bottoms content. To this was added the indicated amount of TBP, i.e., 2,2'-thiobis (4-methyl-6-t-butylphenol). The mixture was then heated at 300° C. for 5 hours. The data shows effective disproportionation and bleaching. Abietic acid content was determined by UV and the colors are based on the conventional French scale wherein 4A represents four grades lighter than X and 3A is one grade lighter than 2A.

EXAMPLES 7–8

Table IV below demonstrates effective disproportionation of two mixtures containing rosin. Example 7 is a mixture of 55 parts of a tall oil fraction of typical analysis 94.2% fatty acids, 4.2% rosin acids, and 1.6% unsaponifiables, and 45 parts of the same type rosin as in Examples 1–6. Example 8 mixture is a crude tall oil distillate having the indicated analysis. Temperature of treatment was 300° C., 0.2% of 2,2'-thiobis(4-methyl-6-t-butylphenol was employed in each example, and treatment was effected under a cover of steam rather than nitrogen. Good disproportionation resulted in both instances. "GLC" refers to a gas-liquid chromatographic analysis.

TABLE IV

| | Example | | | | | | | |
|---|---|---|---|---|---|---|---|---|
| | 7 | | | | 8 | | | |
| | Feed | 2 Hrs. | 4 Hrs. | 6 Hrs. | Feed | 2 Hrs. | 4 Hrs. | 6 Hrs. |
| GLC Analyses: | | | | | | | | |
| Oleic Acid, percent | 25.7 | 31.3 | 32.6 | 33.6 | 26.0 | 28.7 | 28.4 | 31.6 |
| Linoleic: | | | | | | | | |
| Conjugated, percent | 7.0 | 12.5 | 10.5 | 8.3 | 6.1 | 11.1 | 9.3 | 8.1 |
| Non-Conjugated, percent | 20.9 | 7.2 | 4.9 | 4.4 | 20.1 | 8.0 | 5.9 | 5.0 |
| Abietic Acid, percent | 12.1 | 0.5 | 0.0 | 0.0 | 12.7 | 0.5 | 0.0 | 0.0 |
| Dehydroabietic Acid, percent | 9.9 | 24.0 | 26.2 | 28.2 | 8.6 | 21.2 | 24.7 | 25.4 |

EXAMPLES 9–15

Tall oil rosin of the type of Examples 1–6 and the indicated amount of 2,2'-thiobis(4-methyl-6-t-butylphenol) were charged to a 1000-ml. 3-neck flask equipped with a gas inlet tube, thermometer, agitator and condenser. The temperature was raised to approximately 200° C. under nitrogen and then steam substituted for the nitrogen. The disproportionation was carried out at the temperature and concentrations noted in Table V. The reaction was sampled periodically and disproportionation followed by UV analysis. Good disproportionation and bleaching is evident from the results (shown in Table V).

EXAMPLES 19–20

Example 19 of Table VII below show comparative results when the rosin type of Example 1 is disproportionated by heating for 6 hours with the thiobisphenol (TBP) of Example 1 and when disporoportionation is attempted under the same conditions with the known antioxidant MBP, i.e., 2,2'-methylenebis(4-methyl-6-tert-butylphenol). Good disproportionation over the control (rosin heated under same conditions without additive) is evident in the case of treatment in the presence of TBP but essentially no benefit results when MBP is employed.

TABLE V

| Example | Temperature, °C., Feed | Concentration percent | Time, Hours | Abietic Acid, percent, 30.2 | Dehydro-Abietic Acid, percent | Color Y |
|---|---|---|---|---|---|---|
| 9 | 310 | 0.1 | 2 | 3.1 | 31.6 | 6A |
| | | | 4 | 1.5 | 34.9 | 4A |
| | | | 5 | 1.3 | 35.2 | 4A |
| 10 | 300 | 0.1 | 2 | 6.1 | 26.7 | 6A |
| | | | 4 | 3.3 | 31.4 | 6A |
| | | | 6 | 2.3 | 33.5 | 4A |
| 11 | 300 | 0.4 | 1 | 5.6 | 25.6 | 6A |
| | | | 3 | 2.2 | 29.8 | 5A |
| | | | 5 | 1.6 | 25.9 | 3A |
| | | | 6 | 1.6 | 32.1 | 3A |
| 12 | 300 | 0.2 | 1 | 9.3 | ---- | 7A |
| | | | 3 | 3.5 | ---- | 6A–7A |
| | | | 5 | 2.5 | 20.3 | 6A–7A |
| | | | 6 | 1.7 | 28.8 | 6A |
| 13 | 285 | 0.4 | 2 | ---- | ---- | ---- |
| | | | 4 | ---- | ---- | ---- |
| | | | 6 | 4.1 | 26.7 | 6A–5A |
| 14 | 350 | 0.1 | ½ | 2.8 | 34.6 | 3A |
| | | | 1 | 1.1 | 36.7 | WW–WG |
| | | | 1½ | 0.8 | 39.8 | ---- |
| | | | 2 | 0.8 | 39.2 | WW–WG |
| 15 | 350 | 0.5 | *0 | 5.9 | 26.7 | 6A |
| | | | ½ | 1.2 | 34.7 | 2A |
| | | | 1 | 0.8 | 33.9 | X |
| | | | 1½ | 0.7 | 35.3 | X |
| | | | 2 | 0.8 | 36.2 | WW |

*Sample taken as soon as a temperature of 350° C. was reached.

EXAMPLES 16–18

Table VI shows the effective disproportionation and bleaching of other rosin types. Conditions of treatment were essentially the same as in the foregoing examples except as indicated. The catalyst was 2,2'-thiobis(4-methyl-6-t-butylphenol). Acid analysis was by UV. The tall oil S–1 type rosin is a commercialy available rosin substantially the same as that identified in Example 1 except that it contains some bottoms.

Since MBP has the same structure as TBP except for —CH$_2$— in place of —S—, the data demonstrates the surprising character of the invention.

Example 20 of Table VII shows good disproportionation when a rosin sample having substantialy the same typical analysis as that of Example 1, except for presence of some bottoms material is treated as in Example 19. It will be noted in each example that the rosin was bleached

TABLE VI

| Example | Temp., °C. | Concentration, percent | Time, hours | Abietic Acid, percent | Dehydroabietic Acid, percent | Color |
|---|---|---|---|---|---|---|
| 16—Gum Rosin | 300 | 0.1 | Feed | 14.0 | ---- | K |
| | | | 2 | 3.9 | 20.3 | N |
| | | | 5 | 2.4 | 22.2 | N |
| 17—Wood Rosin | 300 | 0.1 | Feed | 42.6 | ---- | M |
| | | | 2 | 4.1 | 24.5 | X |
| | | | 3½ | 3.0 | 26.9 | WW–WG |
| | | | 5 | 2.3 | 27.6 | WG–N |
| 18—Tall Oil, S–1 Rosin | 210 | 0.1 | Feed | 29.9 | 20.2 | ---- |
| | | | 2 | 2.7 | 25.4 | 3A |
| | | | 4 | 1.5 | 32.5 | X |
| | | | 6 | 1.3 | 31.6 | K | as well as disproportionated. Colors are based on the french scale standards and abietic acid analysis was by ultraviolet analysis.

TABLE VII

| | Time Hours | Abietic Acid, Percent | Color |
|---|---|---|---|
| Example 19: | | | |
| Control | 2 | 12.3 | 4A |
| | 4 | 13.0 | 4A |
| | 6 | 12.8 | 3A |
| Feed | | 28.2 | Y |
| MBP | 2 | 13.2 | 4A |
| | 4 | 13.7 | 4A |
| | 6 | 13.1 | 3A |
| TBP | 2 | 4.4 | 6A |
| | 4 | 2.5 | 6A |
| | 6 | 1.8 | 5A |
| Example 20: | | | |
| Feed | | 25.3 | X |
| TBP | 2 | 4.4 | 6A |
| | 4 | 2.1 | 5A |
| | 6 | 2.0 | 5A–6A |

EXAMPLES 21–26

Substantially as described in the foregoing examples, commercially available tall oil rosin was heated with TBR, i.e., 4,4'-thiobis(resorcinol), under the conditions and with the excellent disproportionation and bleaching shown in Table VIII below. Initial abietic acid content, dehydroabietic acid content, and color are shown as "feed." Analyses were by ultraviolet (UV) and gas-liquid chromatography (GLC).

TABLE IX

| Example | Time, hrs. | Color | Abietic Acid, Percent | Dehydroabietic Acid, Percent |
|---|---|---|---|---|
| 27 | 2 | | 6.9 | 19.4 |
| | 4 | | 4.4 | 29.7 |
| | 6 | 4A | 2.9 | 32.1 |
| 28 | 2 | | 5.6 | 31.9 |
| | 4 | | 2.6 | 35.1 |
| | 6 | X | 1.6 | 34.1 |
| 29 | 2 | 7A | 9.5 | 25.3 |
| | 4 | 7A | 4.9 | 30.4 |
| | 6 | 6A | 2.9 | 35.2 |
| 30 | 2 | 6A | 6.0 | 29.6 |
| | 4 | 6A | 2.6 | 34.2 |
| | 6 | 4A | 1.3 | 39.2 |
| 31 | 2 | 7A | 9.8 | 23.2 |
| | 4 | 6A | 4.6 | 30.2 |
| | 6 | 6A | 2.6 | 33.2 |

An important advantage of 4,4'-thiobis(resorcinol) and poly[thio(resorcinol)] over the hindered thiobisphenols, e.g., TBP, is shown by Examples 21–31 above. This is the effective disproportionation and bleaching achieved by treatment with the resorcinol compounds of Examples 21–31 at substantially lower concentrations (0.02%) than in the treatment with the hindered thiobisphenols (0.1)%. Moreover, for reasons not fully known, there appears to be an essential difference between bleaching and disproportionation since the lower treating temperatures suitable for bleaching, e.g., 200° C., do not provide appreciable disproportionation (although acceptable for some end uses of the product) over the disproportionation achieved by heating in the absence of treating agent.

TABLE VIII

| Example | TBR, Percent | Temp. °C. | Time hours | Color | UV | | GLC | |
|---|---|---|---|---|---|---|---|---|
| | | | | | Abietic Acid, Percent | Dehydroabietic Acid, Percent | Abietic Acid, Percent | Dehydroabietic Acid, Percent |
| Feed | | | | X | *30.0 | | 30.5 | 28.0 |
| 21 | 0.2 | 280 | 6 | 6A | 2.3 | 30.7 | 0.0 | 54.4 |
| 22 | 0.2 | 300 | 2 | 6A | 2.5 | 32.7 | 0.0 | 56.9 |
| 23 | 0.2 | 325 | ¾ | 4A | 2.0 | 34.8 | 0.0 | 57.6 |
| 24 | 0.2 | 325 | ½ | 6A | 3.2 | 32.3 | 0.6 | 55.5 |
| 25 | 0.05 | 300 | 3 | 6A | 2.9 | 32.9 | 0.5 | 59.1 |
| 26 | 0.02 | 300 | 6 | 4A | 2.4 | 33.4 | 0.3 | 55.4 |

*Typical analysis.

EXAMPLES 27–31

(A) Preparation of poly[thio(resorcinol)]

To a solution of resorcinol in dibutyl ether is slowly added sulfur dichloride. The temperature is held at 10–15° C. for a half hour after the addition and a polymeric black precipitate forms. Sodium hydroxide solution is then added to dissolve the precipitate and the dibutyl ether is stripped by steam distillation. The polymer is thereafter precipitated by addition of hydrochloric acid to the residual aqueous phase and is collected by filtration as a material medium tan in color.

The number-average molecular weight is 1250, corresponding to 8 repeating units (p equals 6 in Formula I above) and elemental composition is in the ranges C 41.58–46.12%, H 2.97–3.39%, S 21.34–25.06%, ash 3.2–4.7%.

(B) Disproportionation and bleaching

Essentially as described in the foregoing examples, commercially available tall oil rosin was heated at 300° C. under a blanket of steam with 0.02% by weight of the polymeric product of part A above. Table IX below shows simultaneous excellent bleaching and disproportionation as compared with a typical feed in which the color was in the range X–Y, abietic acid was 30% and dehydroabietic acid was 15%. The abietic acid and dehydroabietic acid analyses were by ultraviolet.

We claim:

1. A method of disproportionating a rosin comprising heating said rosin until the abietic acid content is reduced to less than 15% at a temperature of about 180° C. to 350° C. in the presence of about 0.01% to 1% of a phenol sulfide of the formula:

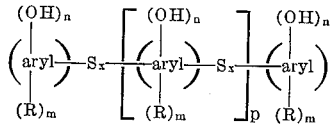

wherein $n$ is an integer from 1 to 3, $p$ is an integer from 0 to 100, $x$ is a number from 1 to 3, the sum of $m$ and $n$ on each aryl is from 1 to 5, aryl is selected from the group consisting of phenyl, naphthyl, and anthracyl, and R is a hydrocarbon radical containing from 1 to 22 carbon atoms.

2. The method of claim 1 wherein said phenol sulfide is poly[thio(resorcinol)] wherein $p$ is in the range 5 to 20.

3. The method of claim 1 wherein said phenol sulfide is 4,4'-thiobis(resorcinol).

4. The method of claim 1 wherein said phenol sulfide is 2,2'-thiobis(4-methyl-6-t-butylphenol).

5. The product prepared by the process of claim 1.

6. The process of claim 1 wherein said heating is continued until the abietic acid content is reduced to less than 5%.

7. The product prepared by the process of claim 6.

References Cited

UNITED STATES PATENTS

| | | | |
|---|---|---|---|
| 3,157,517 | 11/1964 | Tholstrup et al. | 99—163 |
| 3,211,794 | 10/1965 | Coffield | 260—609 |
| 3,253,042 | 5/1966 | Worrell | 260—608 |
| 3,281,473 | 10/1966 | O'Shea | 260—609 |

FOREIGN PATENTS

| | | |
|---|---|---|
| 294,526 | 9/1929 | Great Britain. |
| 512,304 | 4/1955 | Canada. |

OTHER REFERENCES

Tall Oil and Its Uses, published by F. W. Dodge Co., a division of McGraw-Hill, Inc., 1965, pages 11–14 relied upon, copy available in Group 140.

Varnish Constituents, written by H. W. Chatfield, page 41 relied upon, copy available in Scientific Library, Call Number TP 938.c53 (1953).

Catalin Corporation of America, Technical Bulletin, Antioxidants CAO–4 and CAO–6, Published May 1963, pages 1–7 relied upon, copy available in Group 140.

Encyclopedia of Chemical Technology, volume II (1953), pages 796–799 relied upon, copy available in Class 260, Subclass 24 or 97.

"Lovibond Tintometer," bulletin of Hayes G. Shimp, Inc., Page 17 made of record, June 2, 1967.

DONALD E. CZAJA, *Primary Examiner.*

F. McKELVEY, *Assistant Examiner.*